(12) United States Patent
Immonen

(10) Patent No.: US 9,742,255 B2
(45) Date of Patent: Aug. 22, 2017

(54) APPARATUS AND METHOD FOR ELECTRICITY GENERATION

(71) Applicant: Nokia Technologies Oy, Espoo (FI)

(72) Inventor: Ari Immonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 267 days.

(21) Appl. No.: 14/463,237

(22) Filed: Aug. 19, 2014

(65) Prior Publication Data
US 2015/0076928 A1 Mar. 19, 2015

(30) Foreign Application Priority Data

Aug. 27, 2013 (GB) .................... 1315189.9

(51) Int. Cl.
*H02K 35/02* (2006.01)

(52) U.S. Cl.
CPC .................... *H02K 35/02* (2013.01)

(58) Field of Classification Search
CPC ........... H02K 35/00; H02K 35/02; F03G 7/08
USPC .......... 290/1 R, 44, 53; 310/156.38
See application file for complete search history.

(56) References Cited

U.S. PATENT DOCUMENTS

| 5,777,292 A | 7/1998 | Grigorov et al. |
| 2008/0122312 A1 | 5/2008 | Dickson |

| 2011/0187207 A1* | 8/2011 | Arnold | H02K 35/02 310/11 |
| 2011/0273052 A1* | 11/2011 | Long | B62J 6/06 310/208 |
| 2011/0285146 A1* | 11/2011 | Kozinsky | H02K 35/02 290/1 R |

FOREIGN PATENT DOCUMENTS

| GB | 2463129 A * | 3/2010 | ............. F03B 13/20 |
| WO | 2007/144873 A2 | 12/2007 | |
| WO | 2010/107330 A2 | 9/2010 | |
| WO | 2013/151631 A1 | 10/2013 | |

OTHER PUBLICATIONS

"The Power Is in You!", nPower PEG, Retrieved on Oct. 22, 2014, Webpage available at : http://www.npowerpeg.com/learn-more.
Search Report received for corresponding United Kingdom Patent Application No. 1315189.9, dated Feb. 27, 2014, 3 pages.

* cited by examiner

*Primary Examiner* — Quyen Leung
*Assistant Examiner* — Eric Johnson
(74) *Attorney, Agent, or Firm* — Banner & Witcoff, Ltd.

(57) ABSTRACT

An apparatus comprising: a permanent magnet providing magnetic flux; an electric field generator comprising at least one conductive loop and high permeability material configured to direct magnetic flux preferentially through the at least one conductive loop adjacent a first portion of a length of the at least one conductive loop; and a supporting system configured to support the permanent magnet at a distance from the electric field generator and enable relative movement between the permanent magnet and the electric field generator. A corresponding method.

18 Claims, 6 Drawing Sheets

APPARATUS AND METHOD FOR ELECTRICITY GENERATION

TECHNOLOGICAL FIELD

Embodiments of the present invention relate to an apparatus and method for electricity generation.

BACKGROUND

Many devices require electricity to operate. The electricity may be supplied, for example, via a mains electricity connection or from a local battery cell. Electricity may also be locally generated for example using an alternator or solar cells.

An alternator operates by converting the rotational kinetic energy of the wheels of a moving vehicle to electric energy which is stored in a battery.

BRIEF SUMMARY

According to various, but not necessarily all, embodiments of the invention there is provided an apparatus comprising: a permanent magnet providing magnetic flux; an electric field generator comprising at least one conductive loop and high permeability material configured to direct magnetic flux preferentially through the at least one conductive loop adjacent a first portion of a length of the at least one conductive loop; and a supporting system configured to support the permanent magnet at a distance from the electric field generator and enable relative movement between the permanent magnet and the electric field generator.

According to various, but not necessarily all, embodiments of the invention there is provided a method comprising: enabling support of a permanent magnet providing magnetic flux at a distance from an electric field generator; enabling relative movement between the permanent magnet and the electric field generator; wherein the electric field generator comprises at least one conductive loop and high permeability material configured to direct the provided magnetic flux through the at least one conductive loop closer to a first portion of a length of the at least one conductive loop than a second portion of the length of the at least one conductive loop.

According to various, but not necessarily all, embodiments of the invention there is provided an apparatus comprising: means for supporting a permanent magnet providing magnetic flux at a distance from an electric field generator and for enabling relative movement between the permanent magnet and the electric field generator, wherein the electric field generator comprises at least one conductive loop and high permeability material configured to direct the provided magnetic flux preferentially through the at least one conductive loop adjacent a first portion of a length of the at least one conductive loop.

According to various, but not necessarily all, embodiments of the invention there is provided an apparatus comprising: a permanent magnet providing magnetic flux; an electric field generator comprising at least one conductive loop; high permeability material, adjacent a first portion of a length of the at least one conductive loop, configured to provide a low reluctance path to the magnetic flux through the at least one conductive loop adjacent the first portion of the length of the at least one conductive loop, wherein the low reluctance path is parallel to a high reluctance path to the magnetic flux through the at least one conductive loop adjacent a second, different, portion of the length of the at least one conductive loop; and a supporting system configured to support the permanent magnet at a distance from the electric field generator and enable relative movement between the permanent magnet and the electric field generator.

According to various, but not necessarily all, embodiments of the invention there is provided an apparatus comprising: a permanent magnet providing magnetic flux; an electric field generator comprising at least one conductive loop and high permeability material configured to direct a majority of the magnetic flux that passes through the at least one conductive loop to a particular portion of the at least one conductive loop; and a supporting system configured to support the permanent magnet at a distance from the electric field generator and enable relative movement between the permanent magnet and the electric field generator.

According to various, but not necessarily all, embodiments of the invention there is provided an apparatus comprising: a permanent magnet providing magnetic flux; an electric field generator comprising at least one conductive loop and high permeability material configured to direct the provided magnetic flux past a first portion of the at least one conductive loop but not past a second portion of the at least one conductive loop; and a supporting system configured to support the permanent magnet at a distance from the electric field generator and enable relative movement between the permanent magnet and the electric field generator.

BRIEF DESCRIPTION

For a better understanding of various examples that are useful for understanding the brief description, reference will now be made by way of example only to the accompanying drawings in which.

DETAILED DESCRIPTION

Figure 1:
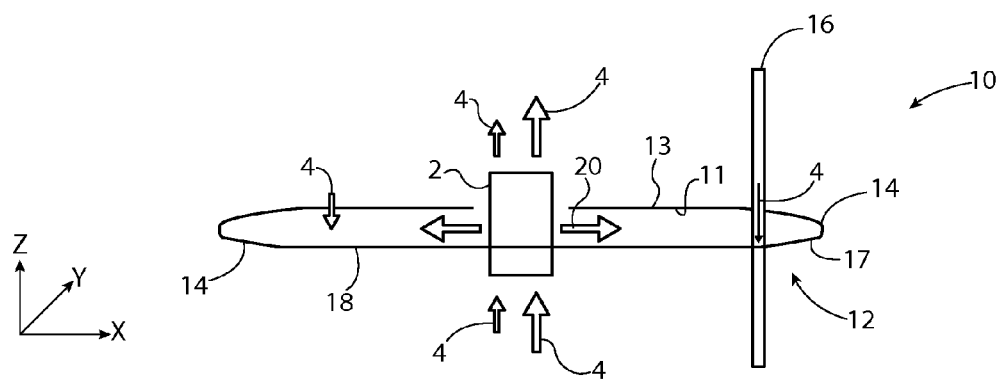
FIG. 1 illustrates an example of an apparatus for small-scale electricity generation.

The Figures illustrate an example of an apparatus 10 comprising: a permanent magnet 2 providing magnetic flux 4; an electric field generator 12 comprising at least one conductive loop 14 and high permeability material 16 configured to direct magnetic flux 4 preferentially through the at least one conductive loop adjacent a first portion 17 of a length of the at least one conductive loop 14; and a supporting system 20 configured to support the permanent magnet 2 at a distance from the electric field generator 12 and enable relative movement between the permanent magnet 2 and the electric field generator 12.

FIG. 1 illustrates an example of an apparatus 10 for small-scale electricity generation. The apparatus 10, in this example, is a kinetic charging apparatus that converts kinetic energy to electrical energy which may, for example, be stored in a battery or used. The kinetic energy may, for example, be generated by movement, such as walking, of a human carrying the apparatus 10.

The apparatus 10 may be used as a electricity generation module in a portable electronic device or as a battery charger.

The apparatus 10 comprises: a permanent magnet 2 providing magnetic flux 4; an electric field generator 12; and a supporting system 20 configured to support the permanent magnet 2 at a distance from the electric field generator 12 and enable relative movement between the permanent magnet 2 and the electric field generator 12.

The electric field generator 12 comprises one or more conductive loops 14 and high permeability material 16 configured to direct the magnetic flux 4 originating from the permanent magnet 2. The high permeability material 16 is configured to direct the magnetic flux 4 preferentially through the at least one conductive loop adjacent the first portion 17 of a length of the conductive loops 14 but not past a second portion 18 of the length of the conductive loops 14.

The length of the conductive loop is the length around the loop, in the plane of the loop.

The first portion 17 of the length of a conductive loop 14 and the second portion 18 of the length of that conductive loop 14 may be in direct opposition across the area surrounded by that conductive loop 14.

In some but not necessarily all examples, the first portion 17 of the length of a conductive loop 14 may be 50% of the whole length of that conductive loop 14 and the second portion 18 of the length of the conductive loop 14 may be the remaining 50% of the whole length of that conductive loop 14.

The magnetic flux 4 originating from the permanent magnet 2 therefore has a high permeability (low reluctance) path through the conductive loops 14 adjacent the first portion 17 of the length of the conductive loops 14 via the high permeability material 16 and a significantly lower permeability (higher reluctance) path through the conductive loops 14 adjacent the second portion 18 of the length of the conductive loops 14. The low reluctance path and the high reluctance path are in parallel. This results in an asymmetric distribution of the magnetic flux 4, which is greater adjacent the first portion 17 of the length of the conductive loops 14 compared to adjacent the second portion 18 of the length of the conductive loops 14. A majority of the magnetic flux 4 may be directed along the high permeability (low reluctance) path through the conductive loops 14 adjacent the first portion 17 of the length of the conductive loops 14 via the high permeability material 16.

The conductive loops have 14 an interior perimeter 11 and an exterior perimeter 13 and the high permeability material 16 is positioned adjacent the interior perimeter 11 of the first portion 17 of the length of the conductive loops 14.

Relative movement between the permanent magnet 2 and the electric field generator 12 results in a time varying magnetic flux within the conductive loops 14 and the generation of electricity. Typically the conductive loops 14 are connected in electrical series, for example, as a solenoid.

The conductive loops 14 and the high permeability material 16 may be configured to have a fixed relative position so that the permanent magnet 2 moves relative to both the conductive loops 14 and the high permeability material 16. The apparatus 10 then converts kinetic energy of the moving permanent magnet 2 to electrical energy.

FIG. 1 defines three mutually orthogonal axes x, y, z where the vector cross-product of a unit vector in the x-direction with a unit vector in the y-direction produces a unit vector in the z-direction. The z-direction is therefore a normal vector to the x-y plane.

The conductive loops 14 lie in one or more planes parallel to the x-y plane.

The conductive loops 14 may be grouped together close to the x-y plane and equally distributed on either side of the x-y plane.

In this example, the high permeability material 16 extends at least partially in the z-direction. This is, in this example, parallel to a magnetic moment of permanent magnet 2.

The high permeability material 16 predominantly comprises material with a relative permeability greater than 100 or greater than 1000. Examples of suitable material include ferromagnetic material such as iron, very high permeability alloys such as MuMetal and Supermalloy and ceramics such as ferrite. As will be described later, in more detail, with reference to FIG. 5, the high permeability material 16 may comprise electrically conductive high permeability material 50 and electrically insulating material 52 configured to reduce eddy currents. The electrically insulating material 52 is arranged as parallel strips that creates barriers within the electrically conductive high permeability material 50 in the y-direction.

Figure 2:
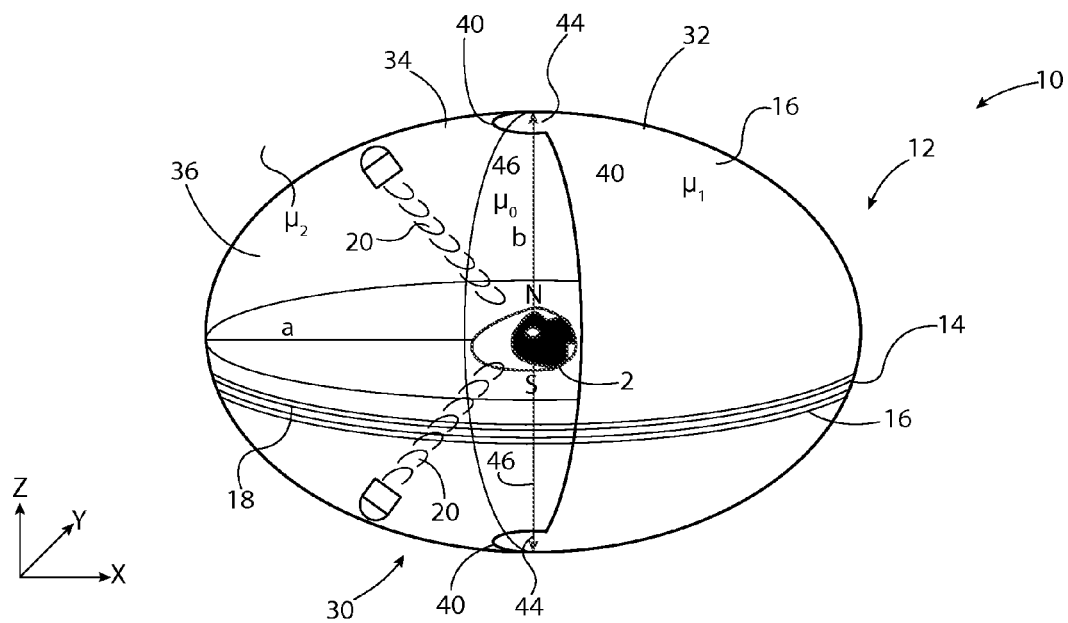
FIG. 2 illustrates a particular example of the apparatus illustrated in FIG. 1 that has an ellipsoidal housing formed from a high permeability housing portion and a low permeability housing portion.

FIG. 2 illustrates a particular example of the apparatus 10 illustrated in FIG. 1 and similar references are used to reference similar features.

The high permeability material 16 is provided as a high permeability housing portion 32. The high permeability housing portion 32 is a shell in that it defines an interior volume (cavity) that is large compared to the thickness of the high permeability housing portion 32.

In some but not necessarily all examples, the interior volume may be a hermetically sealed cavity with a low pressure atmosphere such as a vacuum.

The supporting system 20 is configured to enable movement of the permanent magnet 2 at least partially into and out of the cavity.

The conductive loops 14, in this example, form a solenoid, and the high permeability housing portion 32 provides an interior core to only a segment of the solenoid. The segment of the solenoid corresponds to the first portion 17 of the conductive loops 14. The solenoid has an axis of rotational symmetry in the z-direction that is not an axis of rotational symmetry of the high permeability housing portion 32.

In this particular example, the apparatus 10 comprises a housing 30 comprising the high permeability housing portion 32 defined by the high permeability material 16 and a low permeability housing portion 34 defined by low permeability material 36.

The ratio of the relative permeability of the high permeability material 16 to the relative permeability of the low permeability material 36 may be greater than 10, it may be greater than 100.

The supporting system 20 is configured to support the permanent magnet 2 at a distance from the high permeability housing portion 32 and from the low permeability housing portion 34. It also enables movement of the permanent magnet 2 towards the high permeability housing portion 32 and away from the low permeability housing portion 34 and movement away from the high permeability housing portion 32 and towards the low permeability housing portion 34.

In this example the housing 30 is shaped as a hollow ellipsoid defining an enclosed internal cavity. The supporting system 20 is configured to support the permanent magnet 2 within the cavity and enable its movement within the cavity.

The shape of the ellipsoid is defined by three orthogonal axes a, b, c including a major axis a and two additional axis b, c.

The ellipsoid may be defined by:

$$x^2/a^2 + y^2/b^2 + z^2/c^2 = 1$$

The following conditions define a as the major axis: $a \geq b$ & $a \geq c$.

In some examples, $a=b$ and $a \neq c$. In other examples, $a=c$ and $a \neq b$. In these examples there are two major axis and one minor axis.

In some examples, $a>b$ and $a>c$. In these examples there is one major axis and two minor axes. In some of these examples $a=b$ and in other of these examples $a \neq b$. In some examples $a>c$, which may cause strong magnetic flux at pole regions 44.

In the illustrated example, the ellipsoid is a prolate ellipsoid of revolution and the minor axes are of equal length $b=c$. The ratio of a length of the minor axis to a length of the major axis is, in this example, 7/11. However it may, in some examples, have a value 7/n where n is a real or natural number between 10 and 13 such as 11 or 12.

In this example the ellipsoid is oriented so that one of the minor axes is parallel to a normal vector of the plane defined by the conductive loops 14 i.e. parallel to the z-direction.

The high permeability housing portion 32 is a portion of the ellipsoid that lies predominantly on one side of a virtual plane defined by the two minor axes.

The high permeability housing portion 32 has rotational symmetry about only a single axis (the major axis). In this example, the single axis lies in the x-y plane defined by the conductive loops 14. The conductive loops 14 have an axis of rotational symmetry in the z-direction normal to the major axis.

A boundary 40 of the high permeability material 16 is at least partially aligned with a locus 42 defined by an intersection of the ellipsoid housing 30 and a virtual plane defined by the two minor axes. Thus the first portion 17 of the conductive loops 14 is half of a interior perimeter 17 of the conductive loops 14.

As illustrated in FIGS. 2, 3A, 3B and 3C the boundary 40 of the high permeability material 16 may deviate from the locus 42, defined by an intersection of the ellipsoid housing 30 and a virtual plane defined by the two minor axes, in the regions 44 where, at rest, the magnetic moment 46 of the permanent magnet 2 intersects the ellipsoid housing 30.

The deviation at the regions 44 may be symmetric such that the high permeability housing portion 32 is shaped to have 2-fold rotational symmetry about the single axis (the major axis).

Figure 3A:
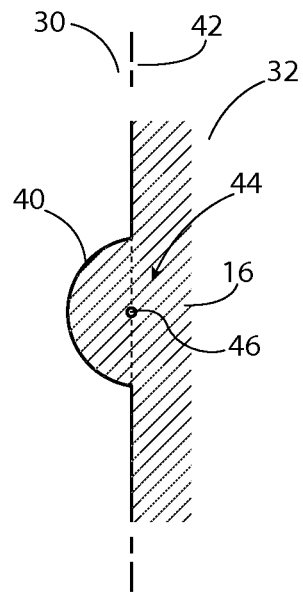
FIGS. 3A, 3B and 3C illustrate examples of how a boundary between the high permeability housing portion and the low permeability housing portion can deviate from a meridian of the ellipse, at the poles of the ellipse.
Figure 3B:
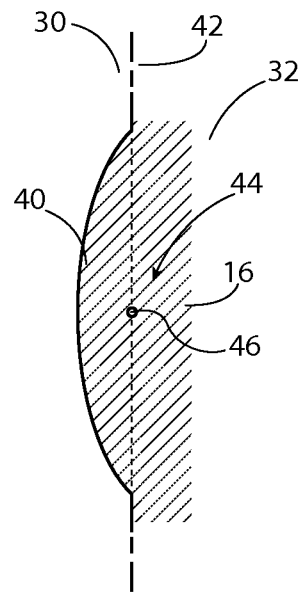

In FIGS. 3A and 3B, the high permeability material 16 is present in the whole of the pole regions 44 of the ellipsoid housing 30 that surround where, at rest, the magnetic moment 46 of the permanent magnet 2 intersects the ellipsoid housing 30.

Figure 3C:
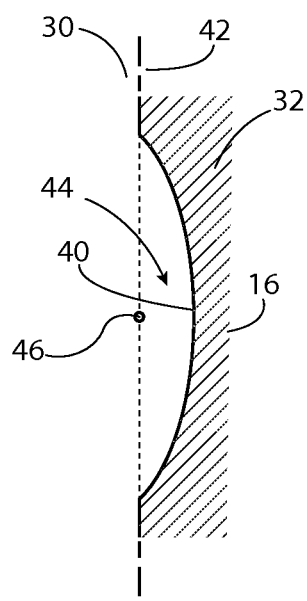

In FIG. 3C, the high permeability material 16 is absent from a whole of the pole regions 44 of the ellipsoid housing 30 that surround where, at rest, the magnetic moment 46 of the permanent magnet 2 intersects the ellipsoid housing 30. The high permeability material 16 lies only to the one side of the virtual plane defined by the two minor axes.

Figure 4:
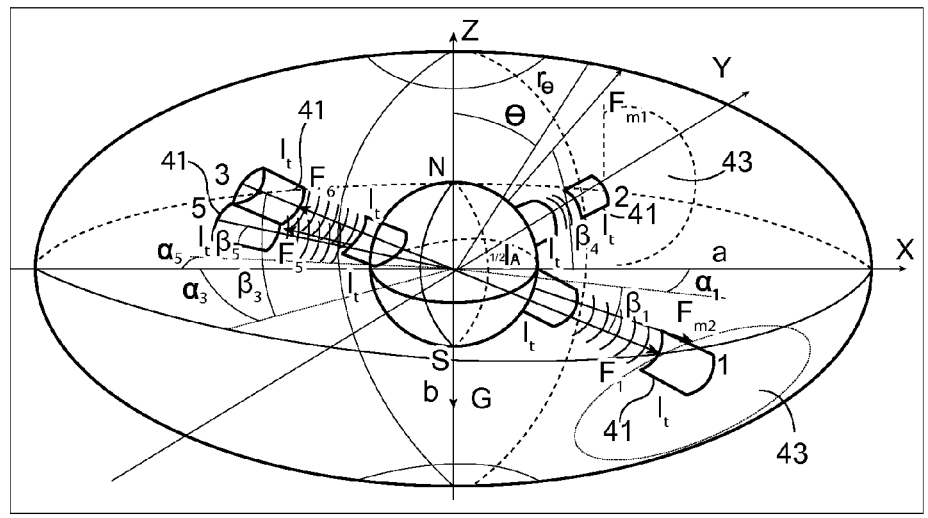
FIG. 4 illustrates an example of a supporting system that may be used with the example of the apparatus illustrated in FIG. 2.

FIG. 4 illustrates an example of a supporting system 20 that may be used with the example of the apparatus 10 illustrated in FIG. 2.

The supporting system 20 comprises one or more springs 41.

In this example, 4 springs are used but one or two springs may alternatively be used.

The supporting system 20 comprises four springs 41. In this example, when the apparatus 10 is stationary and the permanent magnet 2 is at an equilibrium position, the one or more springs 41 are under tension rather than compression.

The apparatus 10 has a preferred orientation with respect to gravity, which defines a downwards direction (−z-direction).

One of the springs 41 is attached to the housing 30 below an equator of the ellipsoid housing 30 to the high permeability housing portion 32. The equator of the ellipsoid housing is defined by the locus of the intersection of the x-y plane and the ellipsoid housing 30.

One of the springs 41 is attached to the housing 30 at the equator of the ellipsoid and at the 40 boundary between the high permeability housing portion 32 and the low permeability housing portion 34.

The two remaining springs 41 are attached to the low permeability housing portion 34 above the equator.

Where a spring 41 is attached to the high permeability housing portion 32 it may be magnetically isolated from the high permeability housing portion 32 by using a low permeability connector 43 at the point of attachment.

The supporting system 20 may be configured to preferentially allow reciprocating (alternating) movement of the permanent magnet 2 along the major axis of the ellipsoid housing 30.

Figure 5A:
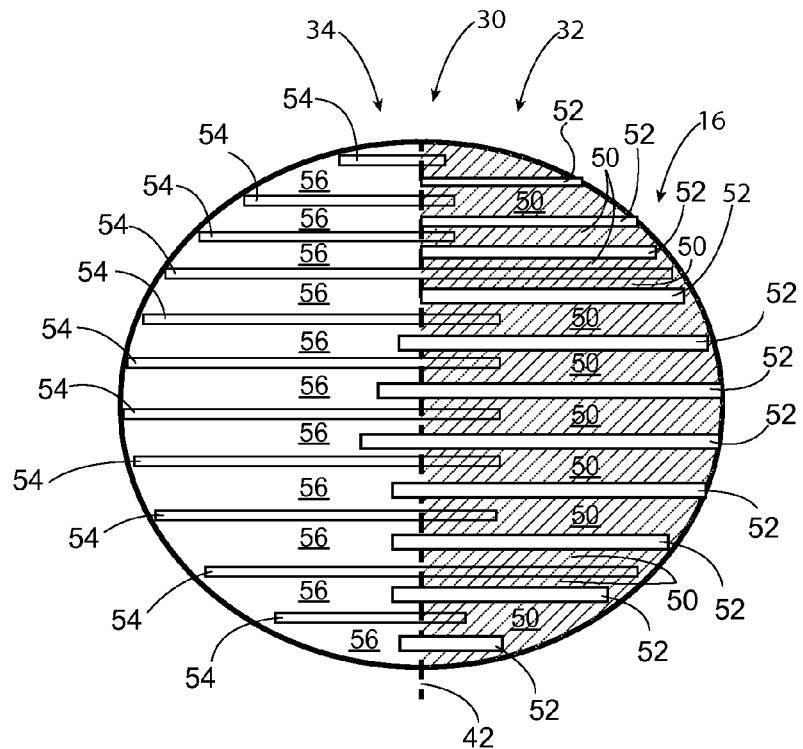
FIGS. 5A and 5B illustrate examples of the ellipsoidal housing, configured to reduce eddy currents.

FIG. 5A illustrates an example of the ellipsoidal housing 30 when viewed from above, along the z-direction.

The housing 30 may comprise first parallel electrically insulating strips 52 separating the high permeability material 16 of the high permeability portion 32 into strips 50. The housing may comprise second parallel electrically insulating strips 54 separating the low permeability material of the low permeability housing portion 34 into strips 56. In some examples the housing does not comprise the second parallel insulating strips 54.

The first parallel electrically insulating strips 52 may have a higher permeability than the second parallel electrically insulating strips 54.

For example, the first parallel electrically insulating strips 52 may be formed from Bakelite and the second parallel electrically insulating strips 54 may be formed from polyethylene.

In this example, the first parallel electrically insulating strips 52 and the second parallel electrically insulating strips 54 at least partially overlap adjacent the boundary 40 between the high permeability housing portion 32 and the low permeability housing portion 34.

The first parallel electrically insulating strips 52 extend wholly across the high permeability housing portion 32. If high permeability material 16 is present in the whole of the pole regions 44, for example as illustrated in FIG. 3A or FIG. 3B, the first parallel electrically insulating strips 52 may extend over locus 42.

The second parallel electrically insulating strips 54 extend wholly across the low permeability housing portion 34 and at least some of them extend partially but not wholly across the high permeability housing portion 34. Some but not all of the second parallel electrically insulating strips 54 may extend wholly across the high permeability housing portion 32.

Figure 5B:
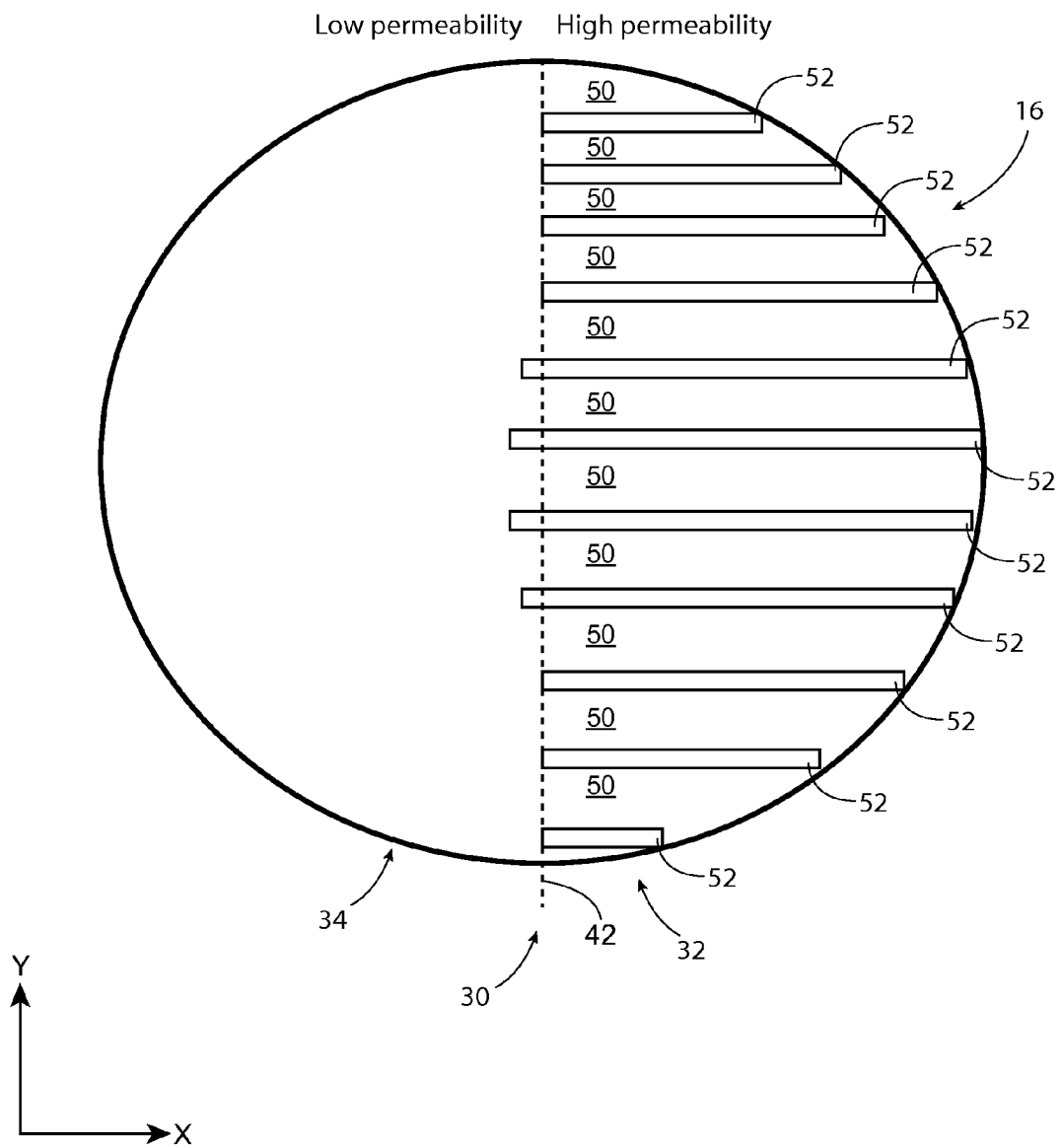

FIG. 5B illustrates another example of the ellipsoidal housing 30 when viewed from above, along the z-direction. The ellipsoidal housing is similar to that illustrated in FIG. 5A, however, it does not have second parallel electrically insulating strips 54 in the low permeability housing portion 34.

The housing 30 comprises first parallel electrically insulating strips 52 separating the high permeability material 16 of the high permeability portion 32 into strips 50.

The first parallel electrically insulating strips 52 may have a higher permeability than the low permeability material of the low permeability housing portion 34.

In this example, at least some of the first parallel electrically insulating strips 52 at least partially overlap the boundary 40 between the high permeability housing portion 32 and the low permeability housing portion 34.

Figure 6A:
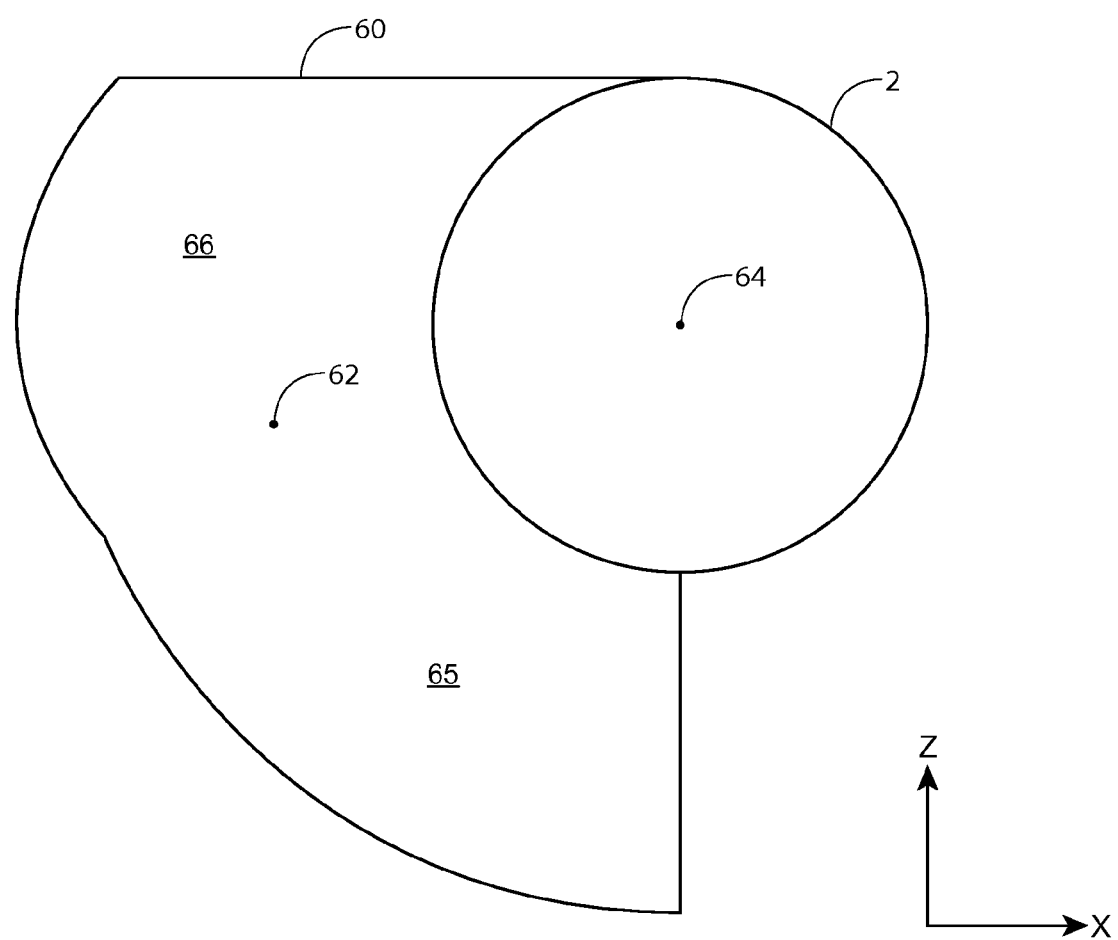
FIGS. 6A and 6B illustrate an example of the permanent magnet that has an additional mass.
Figure 6B:
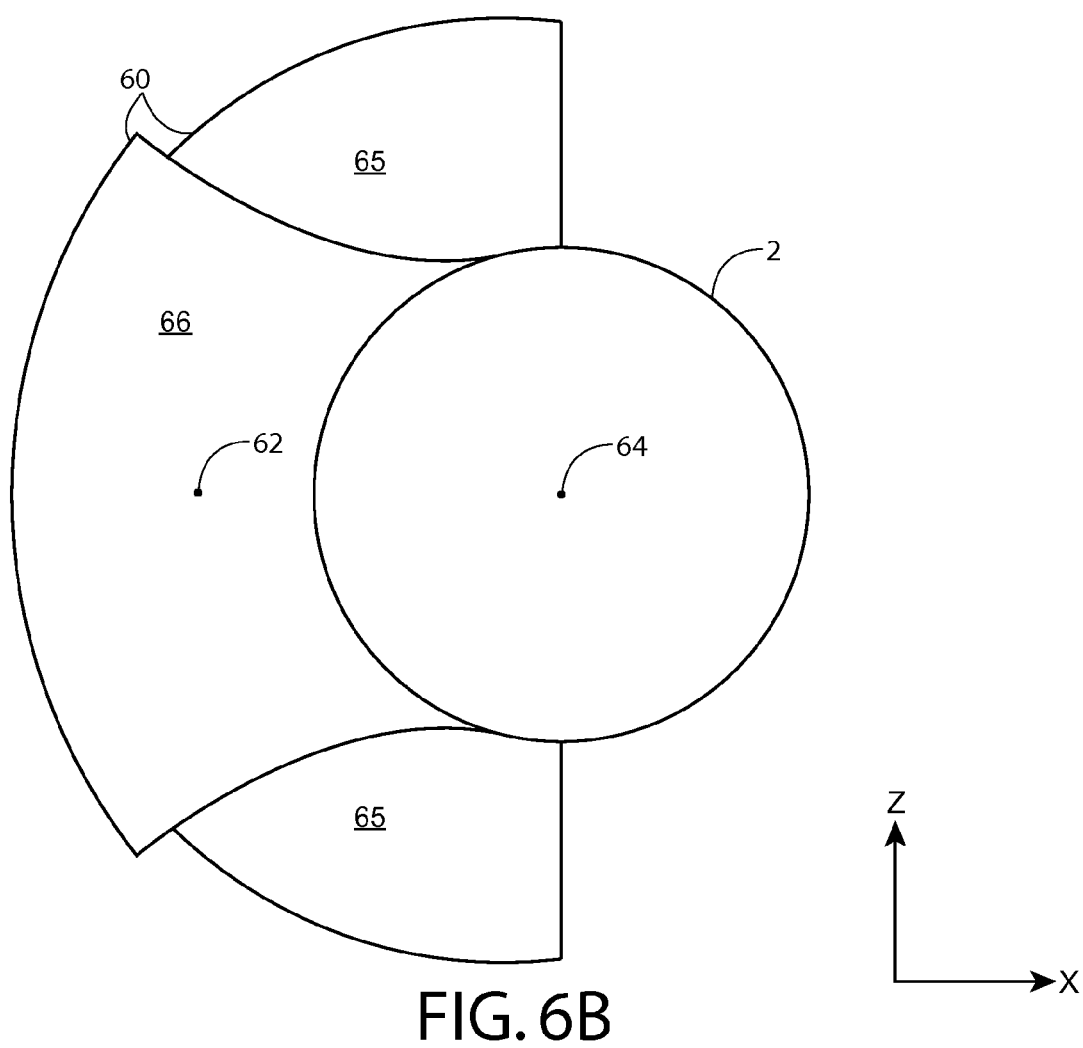

FIGS. 6A and 6B illustrate the permanent magnet 2 in more detail. The inertia of the permanent magnet 3 may be augmented by an additional mass 60. The additional mass 60 has a center of mass 62 that is closer to the second portion 18 (further from the first portion 17) of the conductive loops 14 than a center of mass 64 of the permanent magnet 2.

The additional mass 60 may comprise a part 65 of a ¼ sphere which moves the center of mass 62 closer to the second portion 18 and closer to the conductive loops 14, and an additional segment 66 which moves the center of mass 62 closer to the second portion 18.

FIG. 6A illustrates a cross-section through the x-z plane which illustrates the ¼ sphere shaped part 65 and the additional segment 66 in cross-section. The part 65, in cross-section, is shaped like a ½ circle.

FIG. 6B illustrates a cross-section through the x-y plane.

The additional mass 60 is made from a high density material.

Figure 7:
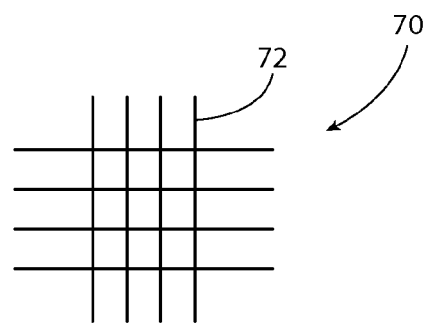
FIG. 7 illustrates a grid of low permeability material that may be placed on an interior surface of the ellipsoidal housing.

FIG. 7 illustrates a grid 70 of low permeability material 72 that may be placed on an interior surface of the high permeability housing portion 32 (and possibly the interior surface of the low permeability housing portion 34) to prevent contact between the permanent magnet 2 and the housing 30.

Referring to the previous figures they illustrate a method comprising:

enabling support of a permanent magnet 2 providing magnetic flux 4 at a distance from an electric field generator 12; enabling relative movement between the permanent magnet 2 and the electric field generator 12;

wherein the electric field generator 12 comprises at least one conductive loop 14 and high permeability material 16 configured to direct the provided magnetic flux 4 past a first portion 17 of the at least one conductive loop 14 but not past a second portion 18 of the at least one conductive loop 14.

The high permeability material 16 may be provided as a portion of a hollow ellipsoid housing 30 containing the permanent magnet 2.

As used here 'module' refers to a unit or apparatus that excludes certain parts/components that would be added by an end manufacturer or a user.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
    a permanent magnet that provides magnetic flux;
    an electric field generator comprising:
    at least one conductive loop,
    a first portion of an ellipsoidal shell formed by a low permeability material that is configured to direct a first portion of the magnetic flux through a first portion of the at least one conductive loop, and
    a second portion of the ellipsoidal shell formed by a high permeability material that is configured to direct a second portion of the magnetic flux through a second portion of the at least one conductive loop, wherein the second portion of the magnetic flux is greater than the first portion of the magnetic flux; and
    a supporting system configured to support the permanent magnet within and at a distance from the ellipsoidal shell and enable relative movement between the permanent magnet and the electric field generator.

2. An apparatus as claimed in claim 1, wherein the at least one conductive loop has an interior perimeter and an exterior perimeter and the first portion of the ellipsoidal shell is positioned closer to the interior perimeter of the first portion of the at least one conductive loop than the interior perimeter of the second portion of the at least one conductive loop.

3. An apparatus as claimed in claim 1, wherein the at least one conductive loop lies in a plane and the high permeability material extends at least partially in a direction parallel to a normal vector of the plane.

4. An apparatus as claimed in claim 1, wherein the ellipsoidal shell is defined by three orthogonal axes including a major axis and two other axes, and the second portion of the ellipsoidal shell is positioned to a greater extent on one side of a virtual plane defined by the two other axes than the other side of the virtual plane.

5. An apparatus as claimed in claim 4, wherein the second portion of the ellipsoidal shell lies only to the one side of the virtual plane.

6. An apparatus as claimed in claim 1, wherein the ellipsoidal shell is defined by three orthogonal axes including a major axis and two minor axes.

7. An apparatus as claimed in claim 6, wherein one of the two minor axes is parallel to a normal vector of a plane defined by the at least one conductive loop.

8. An apparatus as claimed in claim 6, wherein a ratio of a length of a first one of the two minor axes to a length of the major axis is 7/n, where n is greater than 10 and less than 13.

9. An apparatus as claimed in claim 1, wherein the ellipsoidal shell is defined by three orthogonal axes including a major axis and two other axes, and a boundary of the high permeability material is at least partially aligned with a locus defined by an intersection of the ellipsoidal shell and a virtual plane defined by the two other axes.

10. An apparatus as claimed in claim 9, wherein the boundary of the high permeability material deviates from the locus in regions where a normal vector to a plane defined by the at least one conductive loop intersects the ellipsoidal shell.

11. An apparatus as claimed in claim 1, wherein the high permeability material is absent from regions surrounding where a normal vector to a plane defined by the at least one conductive loop intersects the ellipsoidal shell.

12. An apparatus as claimed in claim 1, wherein the high permeability material is present in regions surrounding where a normal vector to a plane defined by the at least one conductive loop intersects the ellipsoidal shell.

13. An apparatus as claimed in claim 1, wherein the high permeability material is shaped to have rotational symmetry about only a single axis.

14. An apparatus as claimed in claim 13, wherein the single axis is in a plane defined by the at least one conductive loop.

15. An apparatus as claimed in claim 13, wherein the high permeability material is shaped to have 2-fold rotational symmetry about only the single axis.

16. A method comprising:
supporting a permanent magnet within and at a distance from an ellipsoidal shell of an electric field generator such that relative movement between the permanent magnet and the ellipsoidal shell is enabled;
wherein the electric field generator comprises:
at least one conductive loop,
a first portion of the ellipsoidal shell formed by a low permeability material that is configured to direct first magnetic flux, provided by the permanent magnet, through a first portion of a length of the at least one conductive loop, and
a second portion of the ellipsoidal shell formed by a high permeability material that is configured to direct second magnetic flux, provided by the permanent magnet and greater than the first magnetic flux, through a second portion of the length of the at least one conductive loop.

17. A method as claimed in claim 16 comprising providing springs to support the permanent magnet and to enable the relative movement of the permanent magnet within the ellipsoidal shell.

18. An apparatus comprising:
a shell having a first shell portion and a second shell portion joined together along a closed boundary for enclosing an interior cavity, the first shell portion and the second shell portion having different permeabilities;
a permanent magnet that provides magnetic flux, wherein the permanent magnet is supported within the interior cavity at a distance from the shell and is movable relative to the shell within the interior cavity; and
at least one conductive loop in at least one plane that intersects the shell, wherein the different permeabilities result in a greater distribution of the magnetic flux adjacent a first portion of the at least one conductive loop than a second portion of the at least one conductive loop.

* * * * *